(12) United States Patent
Niikawa

(10) Patent No.: US 7,057,651 B2
(45) Date of Patent: Jun. 6, 2006

(54) DIGITAL CAMERA HAVING AN ELECTRONIC ZOOM FUNCTION

(75) Inventor: Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 798 days.

(21) Appl. No.: 09/732,205

(22) Filed: Dec. 7, 2000

(65) Prior Publication Data
US 2001/0003464 A1 Jun. 14, 2001

(30) Foreign Application Priority Data
Dec. 14, 1999 (JP) ................................. 11-354565

(51) Int. Cl.
H04N 5/262 (2006.01)
H04N 5/222 (2006.01)

(52) U.S. Cl. ................................ 348/240.1; 348/333.04

(58) Field of Classification Search ..............................
348/240.99–240.3, 333.01, 333.04, 333.08,
348/333.09, 333.11, 333.12, 333.13; 396/374
See application file for complete search history.

(56) References Cited

U.S. PATENT DOCUMENTS

| | | | | |
|---|---|---|---|---|
| 4,945,424 A | * | 7/1990 | Hiroki et al. ................ | 386/118 |
| 5,144,491 A | * | 9/1992 | Ushiro et al. ................ | 359/697 |
| 6,289,178 B1 | * | 9/2001 | Kazami ........................ | 396/60 |
| 6,693,667 B1 | * | 2/2004 | Doron ................... | 348/240.99 |

FOREIGN PATENT DOCUMENTS

| | | | |
|---|---|---|---|
| JP | 04-053368 A | | 2/1992 |
| JP | 06-006654 A | | 1/1994 |
| JP | 06-086131 A | | 3/1994 |
| JP | 06-189173 A | | 7/1994 |
| JP | 10-013726 A | | 1/1998 |
| JP | 11-164176 A | | 6/1999 |
| JP | 11-187301 A | | 7/1999 |
| JP | 11187301 A | * | 7/1999 |
| JP | 11-284898 A | | 10/1999 |
| JP | 11284898 A | * | 10/1999 |
| JP | 11-331662 A | | 11/1999 |

OTHER PUBLICATIONS

"Japanese" Notice of Reasons for Rejection, dated Feb. 24, 2005, for counterpart Japanese Patent Application No. 11-354565, along with an English translation thereof.

* cited by examiner

Primary Examiner—Ngoc-Yen Vu
Assistant Examiner—Timothy J. Henn
(74) Attorney, Agent, or Firm—Sidley Austin LLP

(57) ABSTRACT

A determination is made as to whether or not the magnification set for image sensing is greater than the upper limit of the optical finder. When the set magnification is greater, the original image is subjected to a thinness process, the LCD is automatically turned ON, and the image is displayed. When using electronic zoom, an image of the photographic object corresponding to the effective image sensing magnification is displayed on the LCD 10, thereby avoiding impairing the compactness of the digital camera allowing easy confirmation of the photographic object, and allowing easy framing without providing a large optical finder.

11 Claims, 11 Drawing Sheets

DIGITAL CAMERA HAVING AN ELECTRONIC ZOOM FUNCTION

This application is based on Patent Application No. 11-354565 filed in Japan, the content of which is hereby incorporated by reference.

BACKGROUND OF THE INVENTION

1. Field of the Invention

The present invention relates to a digital camera provided with a zoomable optical finder and electronic finder having an electronic zoom function. The present invention further relates to a recording medium for recording programs readable by the digital camera.

2. Description of the Related Art

Most digital cameras have a finder for electrically displaying an image via liquid crystal device (LCD) or the like (hereinafter referred to as "electronic finder"). However, in such digital cameras, the electronic finder juxtaposed with an optical finder is optionally turned ON/OFF via a switch in order to prevent battery power consumption.

Digital cameras are known which are provided with a electronic zoom function of about 2× without deterioration of image quality in order to enlarge a photographic object while maintaining the compactness of the camera. Since the field of view of the optical finder does not match the actual photographic range during electronic zooming, a field of view frame is displayed in the optical finder during electronic zooming.

Although it is possible to associate the field of view of the optical finder with the actual photographic range in this way, a disadvantage arises in that it is difficult to confirm a photographic subject simply by displaying the photographic range with a simple field of view frame because the subject cannot be optically displayed in enlargement.

Japanese Laid-Open Patent Application No. H6-189173 discloses a digital camera wherein a finder optical system zooms in response to electronic zooming. This application discloses a digital camera provided with an actual zoom function of up to 6× by using together a 3× optical zoom and a 2× electronic zoom, thereby having an optical finder with a 6× zoom ratio corresponding to the combined 6× zoom ratio.

According to this art, however, although the photographic subject is easily confirmed and framing is easily accomplished, the optical finder is provided a zoom function corresponding to the effective zoom function. Accordingly, the optical finder is larger and heavier, and disadvantageously interferes with the compactness of the camera.

An object of the present invention is to eliminate the disadvantages of the conventional art by providing a digital camera and recording medium allowing easy confirmation of a photographic object and easy framing without interfering with the compactness of the digital camera.

SUMMARY OF THE INVENTION

These objects are attained by the digital camera of the present invention comprising: an optical finder for optically viewing a photographic object; an electronic finder for electronically displaying a photographic object; an operation member for performing an electronic zoom; a switching member for switching between an activated state and a deactivated state of the electronic finder; and a controller for setting the electronic finder to the activated state forcedly when the electronic zoom is performed by the operation member.

These objects are further attained by another digital camera of the present invention comprising: an optical finder for optically viewing a photographic object; an electronic finder for electronically displaying a photographic object; an operation member for performing an electronic zoom; a switching member for switching between an activated state and a deactivated state of the electronic finder; a zooming lens for image sensing; and a controller for setting the electronic finder to the activated state forcedly when an effective magnification of one or both an optical zoom of said zoom lens or said electronic zoom exceeds a magnification range of said optical finder.

These objects are further attained by another digital camera of the present invention comprising: an optical finder for optically viewing a photographic object; an electronic finder for electronically displaying a photographic object; an operation member for performing an electronic zoom; a switching member for switching between an activated state and a deactivated state of the electronic finder; a setter for setting a magnification for image sensing when the digital camera is activated; and a controller for setting said electronic finder to the activated state when said magnification is determined to be outside a magnification range of the optical finder.

These objects are further attained by another digital camera of the present invention comprising: an optical finder for optically viewing a photographic object; an electronic finder for electronically displaying a photographic object; an operation member for performing an electronic zoom; a setter for setting a magnification for image sensing when the digital camera is activated; and an indicator for indicating a warning when said magnification is outside a magnification range of the optical finder.

These objects are further attained by A recording medium in which a program to be executed by the digital camera having an optical finder for optically viewing a photographic object, an electronic finder for electronically displaying a photographic object, an operation member for performing an electronic zoom, and a switching member for switching between an activated state and a deactivated state of the electronic finder is recorded and which can be read by a computer, said program implementing: performing the electronic zoom by said operation member; and setting said electronic finder to the activated state forcedly when the electronic zoom is performed.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the present invention are described hereinafter with reference to the accompanying drawings.

FIGS. 1 through 4 respectively show a front view, back view, side view, and bottom view of a digital camera 1 of an embodiment of the present invention. FIG. 5 is a block diagram showing the internal structure of the digital camera 1.

Figure 1:
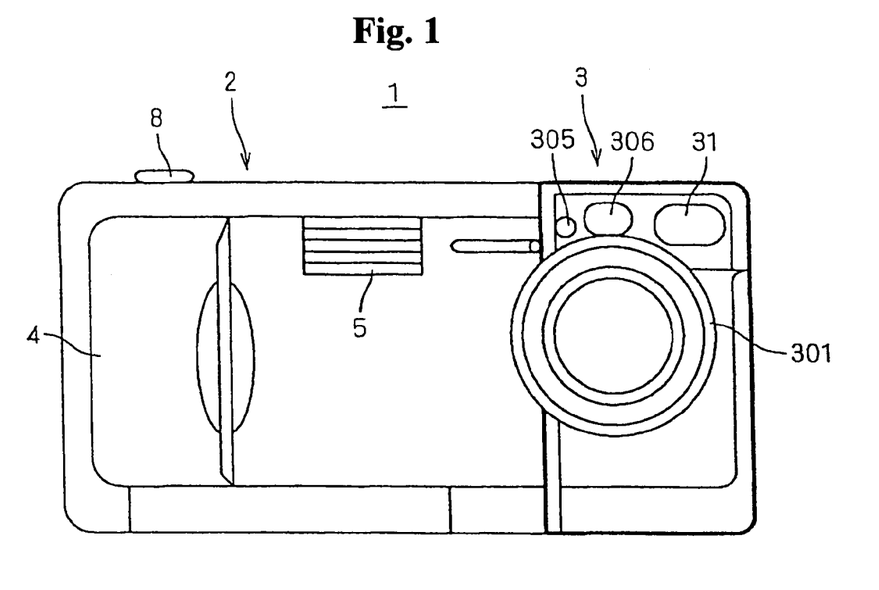
FIG. 1 is a front view of a digital camera of an embodiment of the present invention.

The digital camera 1 comprises a box-like camera body 2, and a rectangular image sensing unit 3 (indicated by the thick lines in FIGS. 1, 2, and 4) as shown in FIG. 1. The image sensing unit 3 has a macro function zoom lens 301 acting as a taking lens, and is provided with an image sensing circuit 302 having a CCD 303 (refer to FIG. 5) acting as a ½ inch size CCD color area sensor disposed at a suitable position behind the zoom lens 301. The zoom lens 301 has a focal length of 7 mm in the wide state and 21 mm in the telecentric state, and has a zoom ratio of 3×. The digital camera 1 is capable of a maximum 6× zoom photography via an electronic zoom function described later.

A light adjusting control circuit 304 having a light adjusting control sensor 305 for receiving the reflected light of the flash from the photographic object is provided at a suitable location within the image sensing unit 3 similar to a camera using silver halide film. In addition, a distance measuring sensor 306 for measuring the distance to a photographic object and an optical finder 31 are provided at suitable locations within the image sensing unit 3. The internal structure of the optical finder 31 is described later.

On the front surface of the camera body 2 is provided a grip 4 on the left end and a built-in flash 5 on the top center, and a shutter button 8 is provided on the top surface, as shown in FIG. 1.

Figure 2:
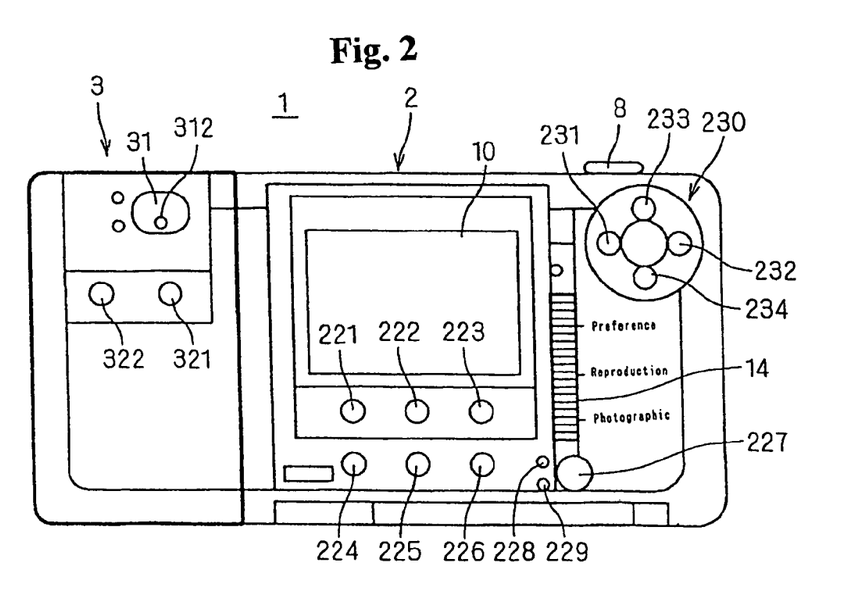
FIG. 2 is a back view of a digital camera of an embodiment of the present invention.

On the back surface of the camera body 2 is provided an LCD 10 as a photographic image monitor display (equivalent to a viewfinder), and for displaying the recorded images at the approximate center of the back surface as shown in FIG. 2. The LCD 10 is equivalent to an electronic viewfinder. Below the LCD 10 are provided key switches 221~226 for operating the digital camera 1, and a power switch 227. On the left side of the power switch 227 are arranged an LED 228 which lights when the power is ON, and an LED 229 which displays while a memory card is being accessed.

Also on the back surface of the camera body 2 is a mode setting switch 14 for selecting among [photographic mode], [reproduction mode], and [preference mode] (refer to FIG. 2). The photographic mode is used for taking photographs. The reproduction mode is a mode for reproducing a photographed image recorded on a memory card and displaying the image on the LCD 10. The preference mode is a mode for settings of various types by selecting a desired item from among display items (setting items). The operations in each mode are described later.

The mode setting switch 14 is a contact point slide switch and sets the photographic mode when at the bottom, sets the reproduction mode at the center, and sets the preference mode at the top, as shown in FIG. 2.

A 4-point switch 230 is provided on the right side of the back surface of the camera. In the photographic mode, a zoom motor 307 (refer to FIG. 5) drives the zoom lens 301 for zooming by pressing the buttons 231 and 232. The zoom lens 301 is driven to the wide side when button 231 is pressed, and driven to the telecentric side when the button 232 is pressed.

On the back of the image sensing unit 3 are provided an LCD button 321 for turning ON and OFF the LCD 10, and a macro button 322. When the LCD button 321 is pressed, the LCD display is switched ON or OFF. For example, during photography using only the optical finder 31, the LCD display is switched OFF to conserve power. When the macro button 322 is pressed during macro photography, an AF motor 308 (refer to FIG. 5) is driven to place the zoom lens 301 in the macro photography enabled state.

Figure 3:
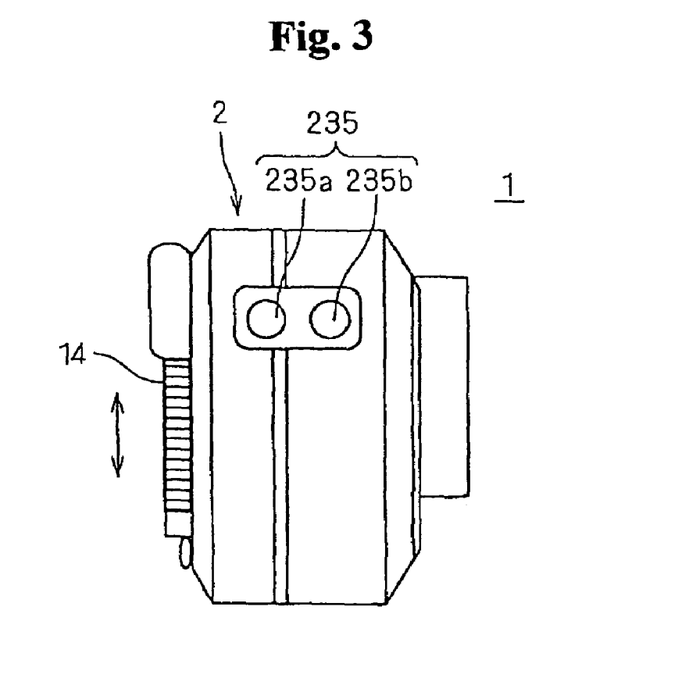
FIG. 3 is a side view of a digital camera of an embodiment of the present invention.

On the side of the camera body 2 is provided a pin unit 235, as shown in FIG. 3. The pin unit 235 is provided with a DC input pin 235a, and a video-out pin 235b for outputting the content displayed on the LCD 10 to an external video monitor.

Figure 4:
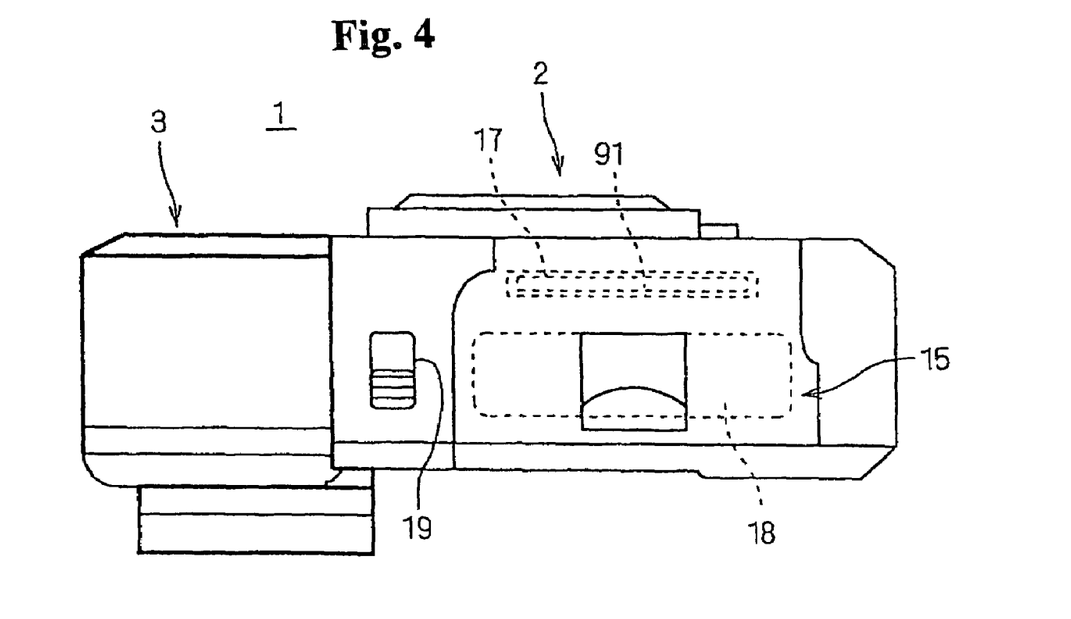
FIG. 4 is a bottom view of a digital camera of an embodiment of the present invention.
Figure 5:
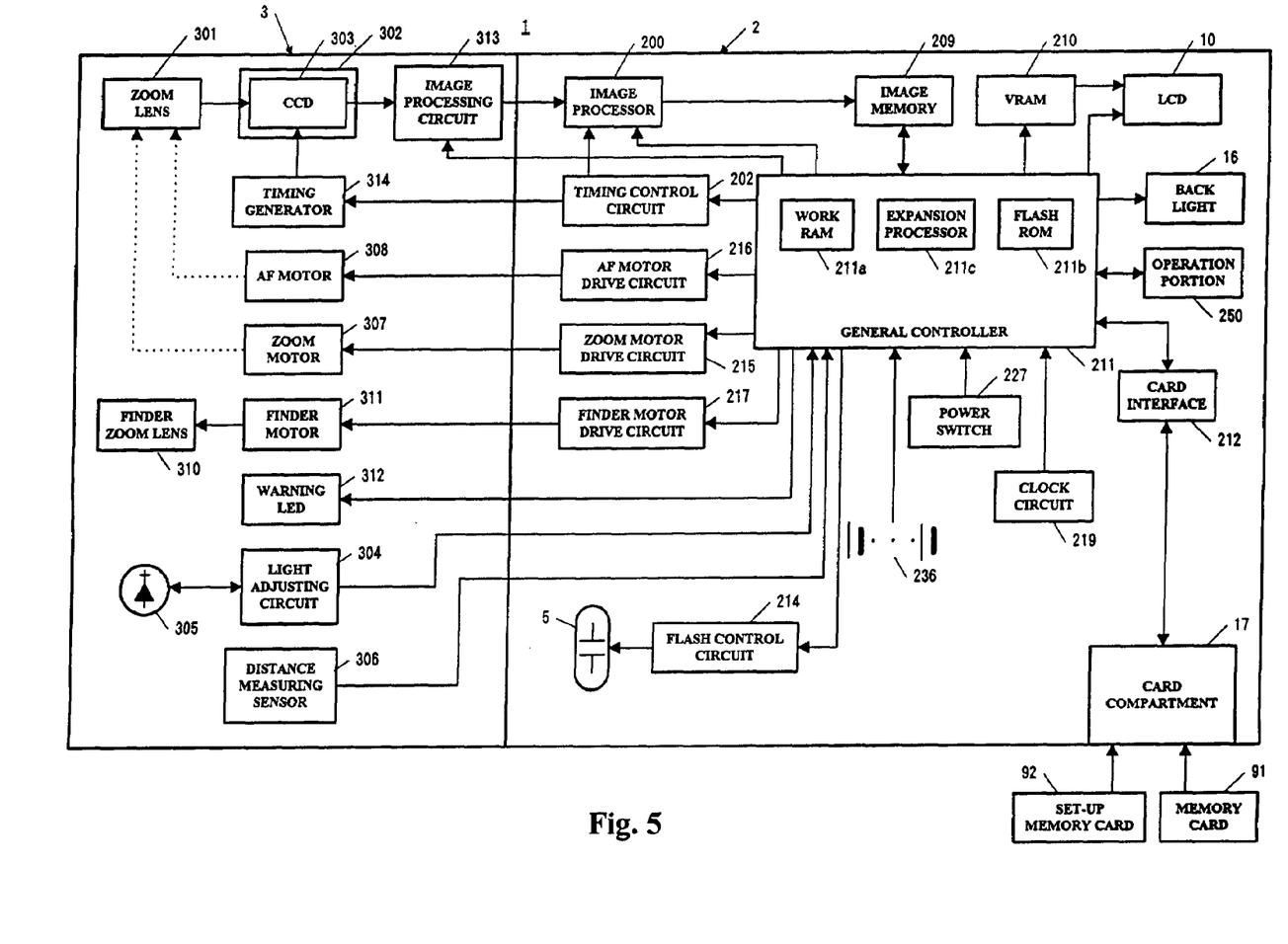
FIG. 5 is a block diagram showing the internal structure of the digital camera of an embodiment of the present invention.

On the bottom surface of the camera body 2 are provided a battery compartment 18 for loading a battery, and a card compartment 17, as shown in FIG. 4. The card compartment 17 has a slot-shaped insertion opening used for inserting a memory card 91 within the camera body 2 to allow writing and reading of image data to/from the memory card 91. Both compartments can be opened and closed using a clam-shell type door. FIG. 4 shows an example with a memory card 91 installed in the card compartment 17.

In the digital camera 1, four AA-size dry cell batteries are installed in the battery compartment 18, and connected in series as to form the power source battery 236 (refer to FIG. 5) which is used as the drive source. Of course, electric power also may be supplied from an adapter using the DC input pin 235a shown in FIG. 4.

The bottom surface is also provided with release lever 19 for releasing the connection between the image sensing unit 3 and the camera body 2 which are connected by a connector and key-like connecting member.

The internal structure of the image sensing unit 3 is described below with reference to FIG. 5.

The image sensing circuit 302 photoelectrically converts an optical image of the photographic object formed on the CCD 303 by the zoom lens 301 using the CCD 303, and outputs the image as red (R), green (G), blue (B) color component image signals (signals comprising a signal series of pixel signals of the light received by each pixel).

Since the diaphragm is fixed in the digital camera 1, exposure control in the image sensing unit 3 is accomplished by regulating the amount of exposure light of the CCD 303 (i.e., the load accumulation time of the CCD 303 corresponding to shutter speed). When a suitable shutter speed cannot be set when the photographic object luminance is a low luminance, unsuitable exposure due to insufficient exposure light can be corrected by adjusting the level of the image signal output from the CCD 303. That is, during times of low luminance, exposure can be controlled by combining shutter speed and gain adjustment. The image signal level adjustment is accomplished by the auto gain control circuit (AGC) within a signal processing circuit 313 described later.

A timing generator 314 generates a drive control signal for the CCD 303 based on a clock signal transmitted from a timing control circuit 202 within the camera body 2. The timing generator 314 generates clock signals, for example, such as a storage start/end timing signal (i.e., exposure start/end), read control signal (horizontal synchronization signal, vertical synchronization signal, transfer signal and the like) of each pixel photoreception signal and the like, and outputs these signals to the CCD 303.

The signal processing circuit 313 performs specific analog signal processing of image signals (analog signals) output from the image sensing circuit 302. The signal processing circuit 313 includes a correlation double sampling (CDS) circuit and an auto gain control (AGC) circuit, and reduces the noise of the image signals via the CDS circuit, and adjusts the level of the image signals by adjusting the gain via the AGC circuit.

The light adjusting control circuit 304 controls the amount of light emitted by the built-in flash 5 during flash photography to the specific amount of light emission set by the general controller 211 of the camera body 2. When the amount of received light attains the specific amount of emission light, a flash stop signal is output from the light adjusting control circuit 304 to the flash control circuit 214 via the general controller 211. The flash control circuit 214 forcibly stops light emission by the built-in flash 5 in response to the emission stop signal, and in this way the amount of light emitted from the flash 5 is controlled to the specific emission amount.

Within the image sensing unit 3 are provided a zoom motor 307 for moving the lens between a housed position and photography position and for changing the zoom ratio of the zoom lens 301, and an autofocus (AF) motor 308 for focus adjustment, and a finder motor 311 for moving the lens to change the zoom ratio of the optical finder.

Figure 6:
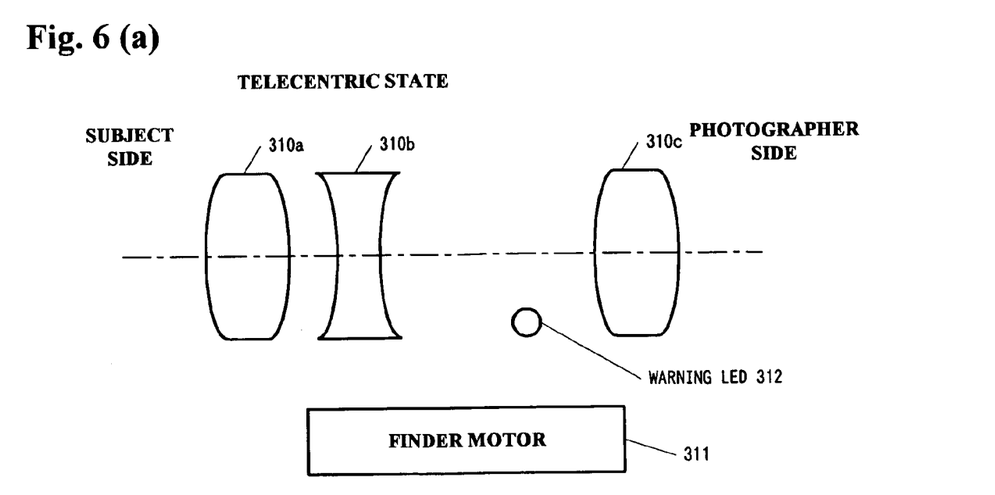
FIGS. 6(a) and 6(b) show the internal structure of the optical finder.

FIGS. 6(*a*) and 6(*b*) show the internal structure of the optical finder 31; FIG. 6(*a*) shows the telecentric state, and FIG. 6(*b*) shows the wide state. The optical finder 31 is provided with a finder zoom lens comprising objective lens 310*a*, lens 310*b* and an eyepiece lens 310*c* as a finder optical system, and the magnification is changed by moving the lens 310*b* in the optical axis direction via the drive of the finder motor 311. The magnification of the finder zoom lens 310 is limited, and in the present embodiment the obtainable magnification is between 1.0~3.0.

A warning LED 312 is provided within the optical finder 31 which warns by lighting with a specific timing described later. A photographer looking through the optical finder 31 easily becomes aware of the switch from the optical finder to the electronic finder by seeing the lighted warning LED 312.

Referring back to FIG. 5, the internal structure of the camera body 2 is described below.

The general controller 211 mainly comprises a CPU, and controls each peripheral structure of the camera body 2 and the interior of the image sensing unit 3 connected by address bus, data bus, and control bus, and performs general control of photographic operations of the digital camera 1.

The flow of the image data in FIG. 5 (and FIG. 7 described later) is indicated by arrows between the peripheral structures, but actually the image data are transmitted to each peripheral structure through the general controller 211. For this reason within the general controller 211 are provided a DRAM work RAM M211*a*, a flash ROM 211*b* for storing control programs, previous magnification when the power is OFF and previous condition of the LCD when the power is OFF, and an expansion processor 211*c* for a thinness process and interpolation process described later.

Image signal processing within the camera body 2 and structures relating to image display are described below.

Figure 7:
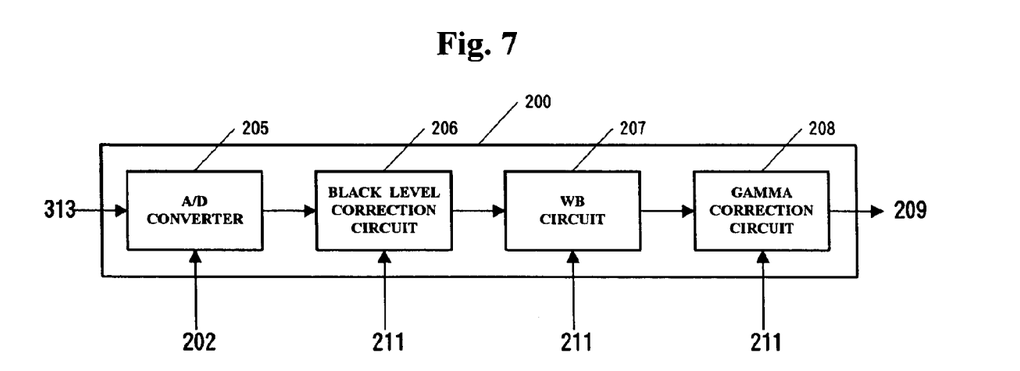
FIG. 7 is a block diagram showing the structure of the image processor.

Analog image signals transmitted from the signal processing circuit 312 of the image sensing unit 3 are subjected to various image processing in the image processor 200 within the camera body 2. FIG. 7 is a block diagram showing the structure of the image processor 200. First, the analog image signal transmitted to the image processor 200 is converted to a 10-bit digital signal for each pixel in the A/D converter 205. The A/D converter 205 converts each pixel signal (analog signal) to a 10-bit digital signal based on the clock signal of the A/D converter input from the timing control circuit 202.

The timing control circuit 202 generates a standard clock signal, and clock signals for the timing generator 314 and A/D converter 205 via control by the general controller 211.

A black level correction circuit 206 corrects the black level the A/D converted pixel signal (hereinafter referred to as "pixel data") to a standard black level. A WB circuit 207 performs level conversion of the pixel data of each color component R, G, B, and adjusts the white balance in consideration of gamma correction in a later process. The white balance adjustment is accomplished using a level conversion table (properly speaking, the data of the table) input from the general controller 211 to the WB circuit, and the conversion coefficient (characteristics slope) of each color component of the level conversion table is set for each photographic image by the general controller 211.

A gamma correction circuit 208 corrects the gamma characteristic of the pixel data. The output from the gamma correction circuit 208 is transmitted to an image memory 209 as shown in FIG. 5.

The image memory 209 is a memory for storing pixel data output from the image processor 200, and has a 1-frame memory capacity. That is, the image memory 209 has a memory capacity sufficient to store pixel data of n×m pixels when the CCD 303 has pixels arrayed in a matrix of n lines and m columns (where n and m are natural numbers), and stores the pixel data in a corresponding memory area (address).

A VRAM 210 is a buffer memory for image data reproduced and displayed on the LCD 10. The VRAM 210 has a memory capacity sufficient to store image data corresponding to the number of pixels of the LCD 10.

According to this construction, in the photography standby state in the photographic mode, pixel data of an image sensed at specific intervals by the image sensing unit 3 are processed by the image processor 200, and stored in the image memory 209. The image data are subjected to a thinness process described later in accordance with the magnification set by pressing the buttons 231 and 232 (hereinafter referred to as "set magnification"), and thereafter transferred to the VRAM 210, and displayed on the LCD 10 (live view display). In this way the photographer is able to visually confirm an object image via the image displayed on the LCD 10.

In the reproduction mode, after the image read from the memory card has been subjected to specific signal processing by the general controller 211, the data are transmitted to the VRAM 210 and reproduced and displayed on the LCD 10. When an image is displayed on the LCD 10, a backlight 16 is lighted via control by the general controller 211.

Another structure within the camera body 2 is described below.

A card I/F 212 is an interface for bi-directional communication with various types of memory cards installed in the card compartment 17. Specifically, writing image data to the memory card, and reading image data from the memory card.

A flash control circuit 214 is a circuit for controlling the emission of the built-in flash 5. The flash control circuit 214 controls the emission or lack thereof, emission amount, and emission timing of the built-in flash 5 based on control signals from the general controller 211, and controls the amount of emission of the built-in flash 5 based on an emission stop signal input from the light adjusting control circuit 304.

A clock circuit 219 manages the photograph date and time, and is driven by a separate battery not shown in the drawings.

Within the camera body 2 are provided a zoom motor drive circuit 215 and AF motor drive circuit 216 for driving the zoom motor 307 and the AF motor 308. These circuits function by the operation of an operating portion 250 of a shutter button 8 and various other types of switches and buttons described later.

For example, the shutter button 8 is a two-stage switch capable of detecting the half-depression state, and full-depression state used by cameras using silver halide film (hereinafter referred to as "silver halide camera"). When the shutter button 8 is depressed half way in the photography standby state, distance information from the distance measuring sensor 306 is input to the general controller 211. Then, the AF motor drive circuit 216 drives the AF motor 308 by instructions from the general controller 211, so as to move the zoom lens 301 to the focus position.

When buttons 231 and 232 are pressed, signals from these buttons are transmitted to the general controller 211, and the general controller 211 specifies the set magnification obtained from the signal. The zoom motor drive circuit 215 drives the zoom motor 307 by means of the aforesaid instruction, so as to move the zoom lens and accomplish zooming. Then, the electronic zoom process described later is executed by the expansion processor 211c. In this way the effective magnification matches the set magnification, with the effective magnification being the actual magnification during live view or photography.

Although the various structures within the camera body 2 have been described above, the general controller 211 accomplishes various other functions such as timing control and transfer of data with peripheral structures through software.

For example, the general controller 211 is provided with a luminance determination function for setting an exposure control value (shutter speed), and a shutter speed setting function. The luminance determination function determines the brightness of a photographic object using the image stored in the image memory 209 and captured every $\frac{1}{30}^{th}$ second by the CCD 303 in the photography standby state. The shutter speed setting function sets the shutter speed (accumulation time of the CCD 303) based on the object brightness determination result of the luminance determination.

The general controller 211 is provided with a filtering process function, recorded image generation function, and reproduction image generation function to accomplish the photographic image recording process.

The filtering process function corrects the high frequency component of the image being recorded via a digital filter to correct image quality relating to contour.

The recording image generation function reads the pixel data from the image memory 209, and generates a thumbnail image and compressed image to be recorded on the memory card. Specifically, pixel data are read for each 8 pixels in both horizontal and vertical directions while scanning from the image memory 209 in the raster scan direction. Next, a thumbnail image is generated and transferred to the memory card and recorded on the memory card. When recording the compressed image data on the memory card, all pixel data are read from the image memory 209, subjected a specific compression processing by a JPEG method such as Hoffman coding or two-dimensional DCT conversion, and recorded on the memory card.

The specific operation is described below. When a photograph is specified by the shutter button 8 in the photography mode, a thumbnail image of the image in the image memory 209 is generated, and a compressed image compressed by a JPEG method is generated based on the set compression ratio, and both images together with tag information relating to the photographed image (information such as frame number, exposure value, shutter speed, compression ratio, date, time, flash ON/OFF data, scene information, image determination result and the like) are recorded on the memory card.

The reproduction image generation function generates a reproduced image by expanding the compressed image recorded on the memory card. The specific operation is described below. When the mode setting switch 14 sets the reproduction mode, the image data of the highest frame number in the memory card are read and expanded, and transferred to the VRAM 210. In this way the image of the highest frame number, i.e., the latest photographed image, is displayed on the LCD 10.

As shown in FIG. 5, when the memory card 91 is loaded in the card compartment 17 and processing described later is executed, the general controller 211 performs controls of the various parts described later, and normally, the control programs are installed in the flash ROM within the general controller 211. However, other control programs and update programs for updating the control programs may be recorded on a recording medium such as the set-up memory card 92 which is loaded in the card compartment 17, such that the control programs and update programs can be read and installed from the set-up memory card 92.

The various processes of the digital imaging device of the present invention are described below.

Figure 8:
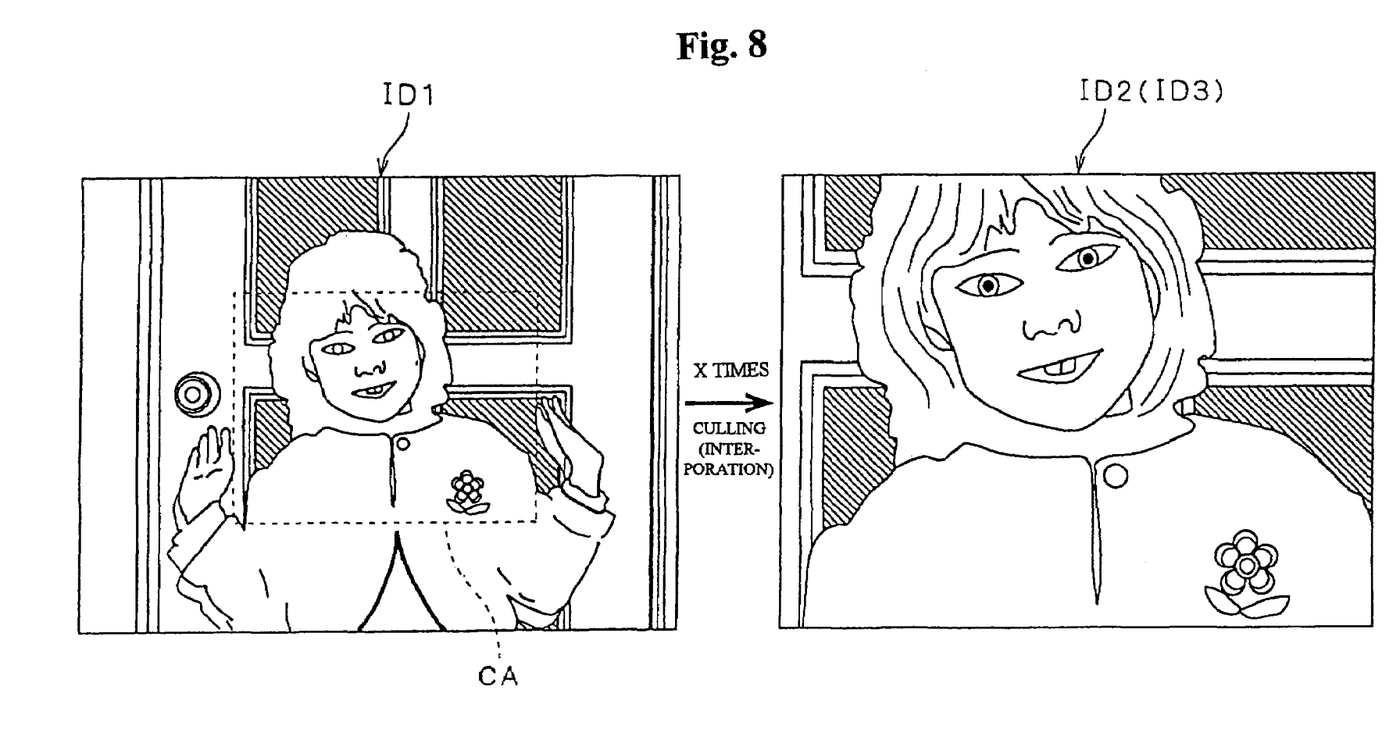
FIG. 8 shows the condition of the electronic zoom process.

FIG. 8 shows the condition of the electronic zoom process. In the digital camera 1 of the present embodiment, when the set magnification is greater than a specific magnification, specifically, when the set magnification is greater than the upper limit magnification (zoom ratio) 3.0× of the zoom lens 301, the optical zoom of 3.0× of the zoom lens is used together with the electronic zoom. The electronic zoom process is described below.

First, the thinness process is described which is an electronic zoom process in live view. As shown in FIG. 8, in 2× zooming, for example, a ½ thinness process is performed on image data of an area of 800×600 pixels in the center area among the 1600×1200 pixel image data within the image memory 209, to derive image data of 400×300 pixels, which are stored in the VRAM 210. In this way the image data of 400×300 pixels stored in the VRAM 210 are displayed on the LCD 10.

Similarly, during electronic zooming in live view, an Int(x/4) thinness process is performed on image data of region CA of Int(1600/x)×Int(1200/x) in the center area of the image data ID1 of 1600×1200 pixels (in the present embodiment, x is a number equal to or greater than 1 but less than 2, in steps of 0.1 as one step), to derive image data ID2 of 400×300 pixels which are stored in the VRAM 210 and displayed on the LCD 10. Int(a) is a function representing the area of integer a.

In the electronic zoom during live view, only image data of area CA corresponding to the set magnification are read in the center of the image data in the image memory 209, culled according to the number of pixels of the LCD 10, and displayed.

The electronic zoom process during photography is described below. When photographing at 2× electronic zoom, a 2× linear interpolation process is performed on the image data of area CA of 800×600 pixels in the center area of the image data ID1 of 1600×1200 pixels in the image memory 209, and the data are stored in again in image memory 209 as 1600×1200 pixel image data ID3, and thereafter subjected to the previously mentioned compression process and the like and recorded on the memory card.

Similarly, when using X-magnification electronic zooming during photography, an X-magnification linear interpolation process is performed on image data within the Int (1600/x)×Int(1200/x) in the center area of the image data of 1600×1200 pixels, and the data are again stored in image memory 209 as 1600×1200 pixel image data, then subjected to the previously mentioned compression process and the like and recorded on the memory card.

In this way in electronic zooming during photography, only the image data of area CA corresponding to the set magnification are read from the center of the image data in the image memory 209, interpolation is performed to obtain image data identical to the original number of pixels, and again stored in image memory 209, and after the previously described processing, the data are recorded on the memory card.

The thinness process and interpolation process are accomplished by the expansion processor 211c of the general controller 211 using the work RAM 211a of the general controller 211 and the image memory 209.

Processes performed from the switching ON of power to the switching OFF of power in the digital camera of the present embodiment are described below.

Figure 9:
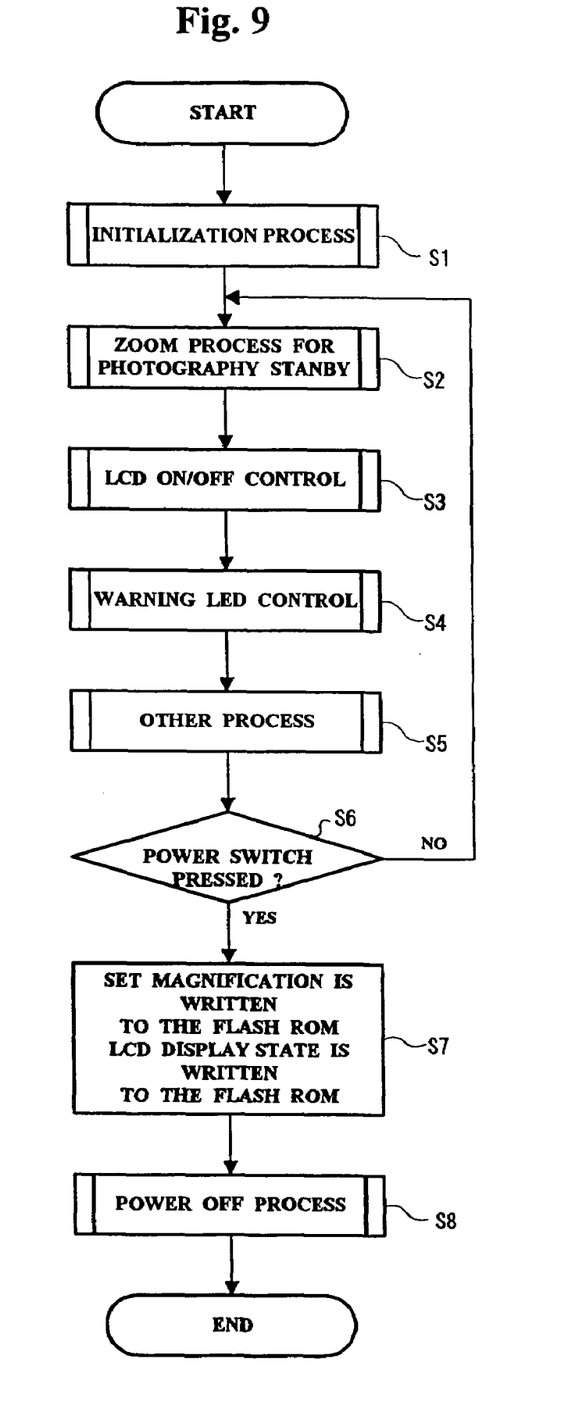
FIG. 9 is a flow chart showing the processing sequence from power ON to power OFF.

FIG. 9 is a flow chart showing the sequence of processing after power is turned ON until power is turned OFF in the digital camera 1 of the present embodiment. The first process is the initialization process. (step S1).

Figure 10:
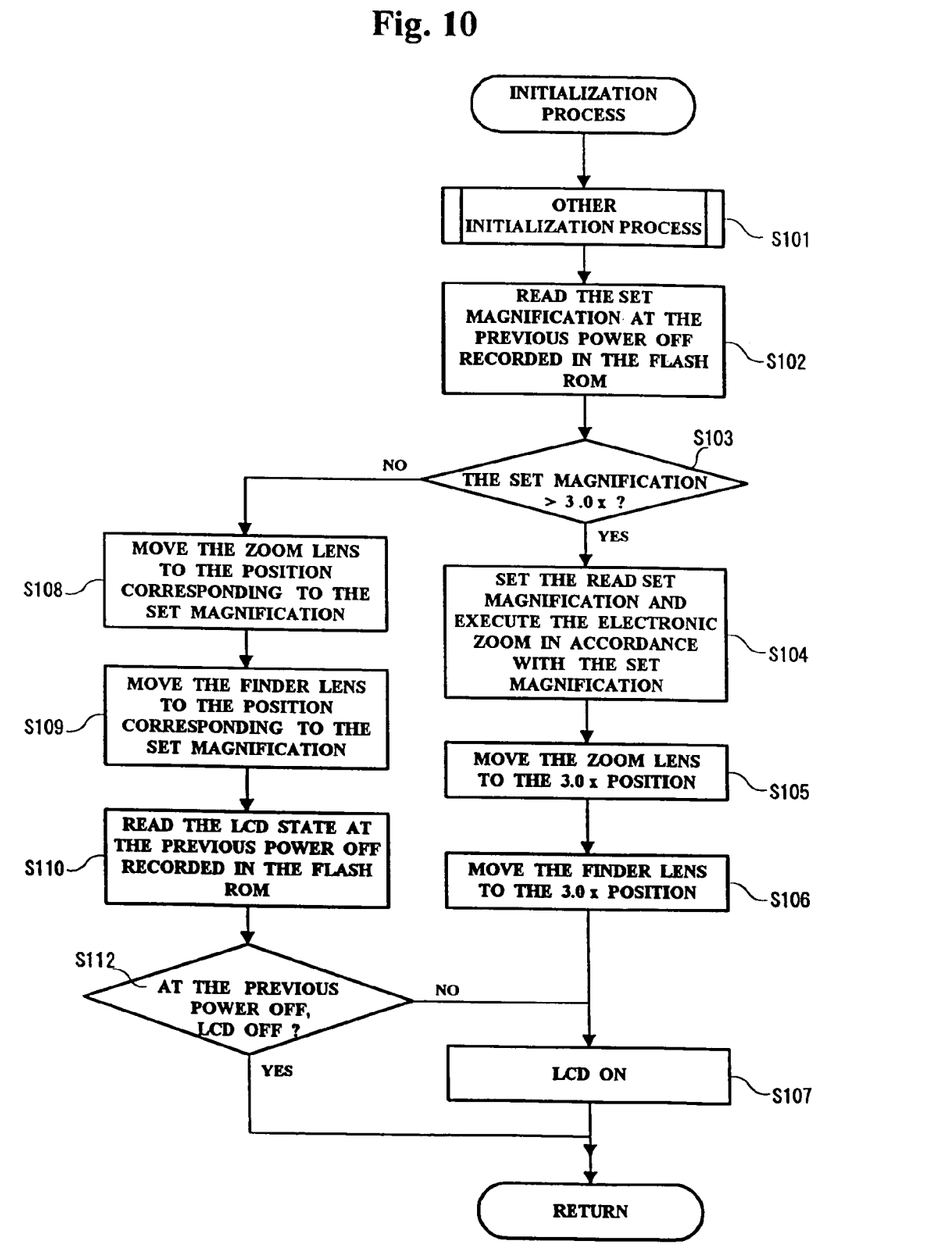
FIG. 10 is a flow chart showing the initialization process sequence.

FIG. 10 is a flow chart showing the sequence of the initialization process. In the initialization process, first, other initialization processes are executed (step S101). Specifically, the work RAM 211a, VRAM 210, and image memory 209 are initialized. Then, when the set magnification at the previous power OFF is greater than 3.0×, the LCD 10 is forcibly turned ON because the electronic zoom is used. Furthermore, the warning LED 312 is lighted when the electronic zoom is used in the warning LED control of the main routine. The set magnification when the power was previously turned OFF is the effective magnification at the previous power OFF.

Next, the set magnification (effective magnification) at the previous power OFF recorded in the flash ROM 211b is read (step S102). That is, in the present embodiment, the set magnification at actuation is identical to the set magnification at the previous power OFF, and for this reason the set magnification at the previous power OFF recorded in the flash ROM 211b when the camera was last used (i.e., the process of step S7 described later) is read out from memory.

Then, a determination is made as to whether or not the set magnification of the previous power OFF is greater than 3.0× (step S103), and if the set magnification is greater than 3.0×, the routine advances to step S104, whereas when the set magnification is not greater than 3.0×, the routine advances to step S108.

The following process is executed when the set magnification at the previous power OFF is greater than 3.0×.

First, the read set magnification of the previous power OFF is set, and electronic zooming is executed in accordance with the set magnification (step S104). That is, electronic zooming is performed at a magnification of the set magnification divided by 3.0.

Then the zoom lens 301 is moved to the 3.0× position by the drive of the zoom motor 307 (step S105). That is, the effective magnification of both the optical zoom and electronic zoom are set to equal the set magnification (greater than 3.0×).

Then, the finder zoom lens 310 is moved to the 3.0× position by the drive of the finder motor 311 (step S106). Then, the LCD 10 is turned ON (step S107). In this way the LCD 10 displays image data subjected to the previously described thinness process. The process ends when the set magnification greater than 3.0× has been set.

The process when the set magnification of the previous power OFF is less than 3.0× is determined in step S103 is described below.

First, the zoom lens 301 is moved to the position corresponding to the set magnification by the drive of the zoom motor 307 (step S108). Then, the finder zoom lens 310 is moved to the position corresponding to the set magnification by the drive of the finder motor 311 (step S109). The effective magnification is then equal to the set magnification.

Next, the ON/OFF state of the LCD 10 recorded in the flash ROM 211b at the previous power OFF is read (step S110).

Then, a determination is made as to whether or not the LCD 10 was OFF at the previous power OFF (step S112). When the LCD 10 was ON, the routine advances to step S107, and the LCD 10 is turned ON. Conversely, when the LCD 10 was OFF, the initialization process ends.

Referring to FIG. 9, the zoom process for photography standby (live view) is executed (step S2). In step S2, when the button 231 is pressed, the zoom magnification is decreased one step, and when the button 232 is pressed, the zoom magnification is increased one step. Electronic zoom is used when the set magnification is greater than 3.0×.

Figure 11:
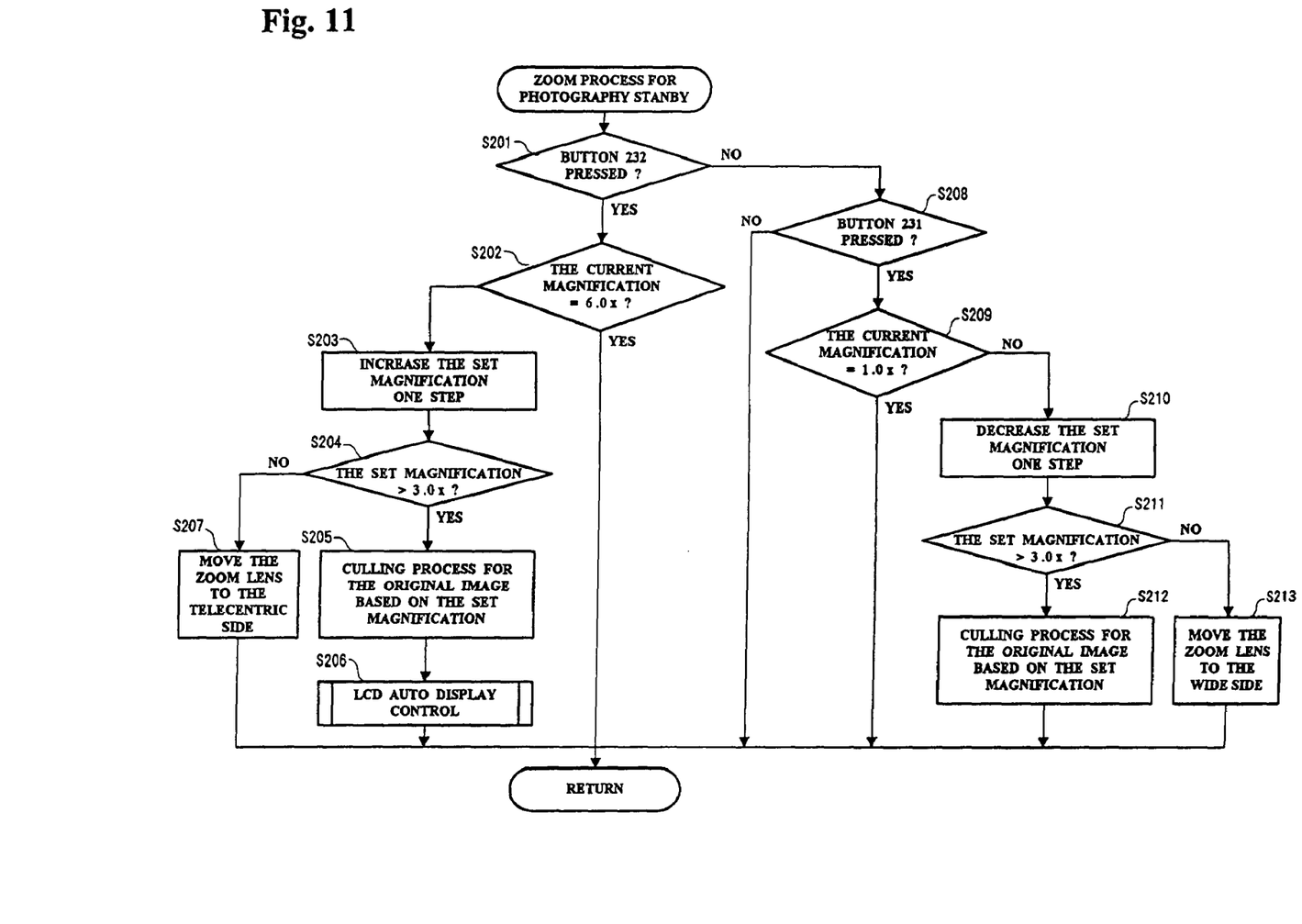
FIG. 11 is a flow chart showing the zoom process sequence during the photography standby.

The zoom process during photography standby is described below. FIG. 11 is a flow chart showing the sequence of the zoom process during photography standby.

First, a determination is made as to whether or not button 232 has been pressed (step S201); if the button 232 has been pressed, the routine advances to step S202, whereas if the button 232 has not been pressed, the routine advances to step S208.

The process when button 232 has been pressed is described below. First, a determination is made as to whether or not the current set magnification is 6.0× (step S202). If the set magnification is 6.0×, the zoom process for photography standby ends because the effective magnification cannot be increased. When the current set magnification is not 6.0×, the routine advances to step S203.

When the set magnification is not 6.0×, the set magnification is increased one step (step S203).

Then, a determination is made as to whether or not the set magnification is greater than 3.0× (step S204). If the set magnification is greater than 3.0×, the routine advances to step S205, whereas when the set magnification is not greater than 3.0×, the routine advances to step S207.

When the set magnification is greater than 3.0×, the original image is subjected to thinness process based on the set magnification (step S205).

Then, the LCD automatic display process is executed (step S206).

For example, when the set magnification is 2.8× and the button 232 is pressed once, the optical zoom is increased to 2.9×, and when pressed once more, the optical zoom is increased to 3.0×. Since the limit of the optical zoom is exceeded when the button 232 is pressed once more, both 3.0× optical zoom and electronic zoom controls are executed. If the LCD 10 display is OFF at this time, the LCD 10 is turned ON in addition to the warning. This process is the LCD automatic display control process. Details of the process sequence are described below.

Figure 12:
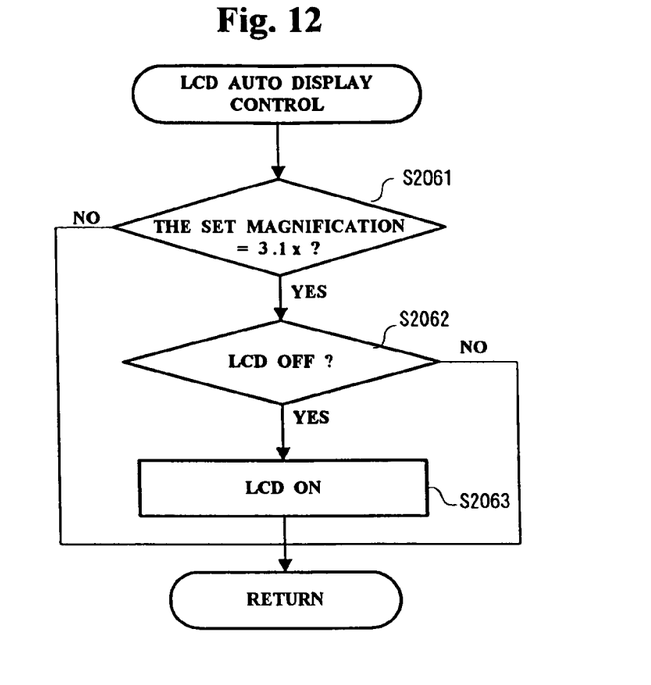
FIG. 12 is a flow chart showing the process of LCD automatic display control.

FIG. 12 is a flow chart showing the process of the LCD automatic display control. In the LCD automatic display control process, it is necessary to start the LCD display with a set magnification of 3.1×, and, therefore a determination is made as to whether or not the set magnification is 3.1× (step S2061). When the set magnification is not 3.1×, the LCD automatic display control process ends, whereas when the set magnification is 3.1×, the routine advances to step S2062.

When the set magnification is 3.1×, a determination is made as to whether or not the LCD 10 is turned OFF (step S2062). If the LCD 10 is ON, the LCD automatic display control process ends, whereas when the LCD 10 is OFF, the routine advances to step S2063, and the LCD 10 is turned ON for display (step S2063).

The LCD automatic display control process ends, and the process ends when the set magnification is determined to be greater than 3.0× in the determination of step S204 of FIG. 11.

Conversely, when the determination of step S204 is that the set magnification is equal to or less than 3.0×, the zoom motor 307 is driven one step to move the zoom lens 301 to the telecentric side (step S207), and the process of the photography standby ends.

The process when the determination of step S204 is that the button 232 has not been pressed is described below.

First, a determination is made as to whether or not the button 231 has been pressed (step S208). If the button 231 has not been pressed, there is not change to the set magnification, and the process of photography standby ends, whereas when button 231 has been pressed, the routine advances to step S209.

When the button 231 has been pressed, a determination is made as to whether or not the current set magnification is 1.0× (step S209). When the current set magnification is 1.0×, the process of photography standby ends because a lesser magnification is impossible. When the current magnification is not 1.0×, the routine advances to step S210.

When the current set magnification is not 1.0×, the set magnification is decreased 1 step (step S210).

Then, a determination is made as to whether or not the set magnification is greater than 3.0× (step S211). When the set magnification is greater than 3.0×, the routine advances to step S212, whereas when the set magnification is not greater than 3.0×, the routine advances to step S231.

When the set magnification is greater than 3.0×, the original image is subjected to the thinness process based on the set magnification (step S212).

Conversely, when the set magnification is equal to or less than 3.0×, the zoom motor 307 is driven one step to move the zoom lens 301 to the wide side (step S213), and the process of photography standby ends.

Referring to FIG. 9, next, the LCD ON/OFF control process is executed (step S3). When the set magnification is 3.1× or greater, the LCD display is not always in the ON state, and a user may optionally set the LCD display to OFF. Regardless of the magnification, the LCD 10 ON/OFF state is switched each time the LCD button 321 is pressed. For this reason the LCD can be positively turned OFF to prevent battery consumption while being aware of the use of the electronic zoom.

Figure 13:
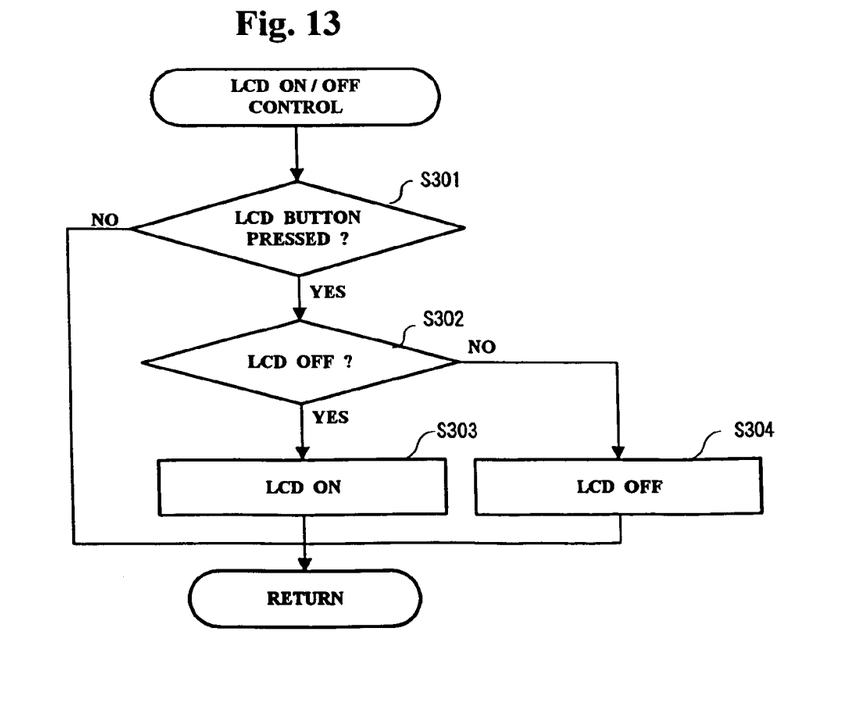
FIG. 13 is a flow chart showing the LCD ON/OFF control process sequence.

The sequence of the LCD ON/OFF control process is described below. FIG. 13 is a flow chart showing the sequence of the LCD ON/OFF control process.

First, a determination is made as to whether or not the LCD button 321 has been pressed (step S301). If the LCD button 321 has not been pressed, the LCD ON/OFF control process ends, whereas when button 321 has been pressed, the routine advances to step S302.

When the LCD button 321 has been pressed, a determination is made as to whether or not the LCD 10 is turned OFF (step S302). If the LCD 10 is OFF, the routine advances to step S303, and the LCD 10 is turned ON for display (step S303). Conversely, if the LCD 10 is ON, the LCD 10 is turned OFF (step S304), and the LCD ON/OFF control process ends.

As can be understood from the zoom process during photography standby of FIG. 11 and the LCD ON/OFF control process described above, the LCD display ON/OFF state does not change even when the button 231 is pressed, and conversely changing from the telecentric side to the wide side, and the magnification is reduced sequentially step-by-step from 6.0× and from 3.1× to 3.0×. This arrangement is due to the strong unease when the LCD is suddenly turned OFF and mistaken belief of a power outage when framing a photo with the LCD 10, which adversely affects operability. In the digital camera 1 of the present embodiment, such events are prevented.

Referring to FIG. 9, the warning LED control process is then executed (step S4). During electronic zoom, since the confirmable range by the optical finder does not match the actual photographic range, the warning LED 312 is always lighted when the set magnification is 3.1 or greater. The power consumption of the LED is not a problem even when always lighted because the power consumption is very slight compared to the LCD 10.

Figure 14:
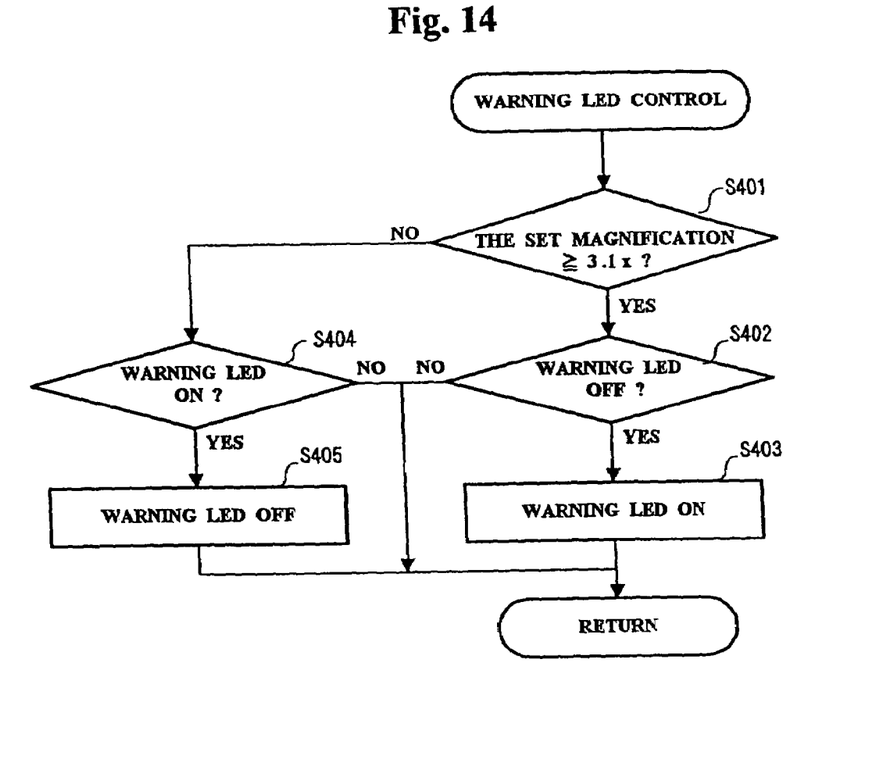
FIG. 14 is a flow chart showing the warning LED control process sequence.

Details of the process sequence of the warning LED control process are described below. FIG. 14 is a flow chart showing the sequence of the warning LED control process.

First, a determination is made as to whether or not the set magnification is 3.1× or greater (step S401). If the set magnification is 3.1× or greater, the routine advances to S402, whereas when the set magnification is not 3.1× or greater, the routine advances to step S404.

When the set magnification is 3.1 or greater, a determination is made as to whether or not the warning LED 312 is OFF (step S402). If the warning LED 312 is ON, the warning LED control process ends, whereas when the warning LED 312 is OFF, it is turned ON (step S403), and the warning LED control process ends.

Similarly, even when the set magnification is less than 3.1×, a determination is made as to whether or not the warning LED 312 is OFF (step S404). If the warning LED 312 is OFF, the warning LED control process ends, whereas when the warning LED 312 is ON, the warning LED 312 is turned OFF (step S405), and the warning LED control process ends.

Referring to FIG. 9, then other processes are executed (step S5). This process is the basic process of the digital camera, and is a process of the photographic mode in which the auto exposure (AE) and autofocus (AF) are performed are by half pressing the shutter button 8. When the shutter button 8 is fully pressed, if necessary flash emission is performed, and image data (i.e., data subjected to the electronic zoom interpolation process) are compressed and recorded on the memory card. The process in the photographic mode is also executed in step S5.

Next, a determination is made as to whether or not the power switch 227 has been pressed (step S6). If the power switch has not been pressed, the routine returns to step S2, and until the power switch 227 has been pressed, the processes of steps S2~S5 are repeated. Then, when the power switch 227 is pressed, the routine advances to step S7.

When the power switch S7 is pressed, the current set magnification (effective magnification) is written to the flash ROM 211*b*, and the state of the LCD 10 display (ON/OFF) is written to the flash ROM 211*b* for use at subsequent start (step S7).

Finally, the power OFF process to turn OFF the power supply is executed (step S8).

This ends the description of the processes performed in the digital camera of the present embodiment.

According to the present embodiment as described above, during electronic zooming by pixel thinness or pixel interpolation by an expansion processor 211*c* used as an electronic zoom means, the LCD 10 is forcibly turned ON as an electronic finder regardless of the previous state. Therefore, since the LCD 10 has a zoom function corresponding to the effective magnification including the electronic zoom by the processing by the expansion processor 211*c*, the image of the photographic object corresponding to the effective sensing magnification during electronic zooming can be confirmed on the LCD 10 even when the optical finder 31 does not possess this zoom function. Accordingly, The compactness of the digital camera is not hindered, the photographic object is easily confirmed, and framing is simple. Furthermore, The electrical power of the digital camera can be conserved by switching OFF the LCD 10 when electronic zoom is not used.

Since the warning LED 312 is lighted and the LCD 10 is turned ON when using the electronic zoom, the photographer is easily aware when electronic zoom is used.

Furthermore, when the effective magnification of the joint operation of the zoom lens 301 as an optical zoom means and the expansion processor 211*c* as an electronic zoom means is outside the magnification range obtainable by the optical finder 31 (specifically, when the effective magnification is greater than 3.0×), the warning LED 31 is lighted and the image is displayed on the LCD 10, such that the mismatch of the photographic range and the field of view of the optical finder 31 can be shown when using the optical finder 31.

Similarly, when the effective magnification of the joint operation of the zoom lens 301 and the expansion processor 211*c* is outside the magnification range obtainable by the optical finder 31 (specifically, when the effective magnification is greater than 3.0×), the LCD 10 is forcibly turned ON regardless of its previous state. In this way the mismatch of the photographic range and the field of view of the optical finder 31 can be shown by referencing the LCD 10 when using the optical finder 31.

Since the LCD 10 is forcibly turned ON when the starting magnification exceeds the range obtainable by the optical finder 31 when the digital camera is started, i.e., when the effective magnification is determined to be greater than 3.0×, the photographer can be alerted to the mismatch between the photographic range and the field of view of the optical finder 31 when the starting magnification exceeds the magnification obtainable by the optical finder 31.

Since the power OFF magnification of the previous power shutdown recorded in flash ROM 211*b* is set as the starting magnification, the photographer need not set the magnification of the previous power OFF because the starting magnification used is the magnification of the previous power OFF, thereby improving operability.

Since an operation switch is provided which is capable of turning OFF the LCD 10 when the LCD 10 is in the forced ON state, battery power consumption can be greatly conserved by turning OFF the power-draining LCD 10 with the full awareness of the mismatch of the photographic range and the field of view of the optical finder 31.

Since the photographer is warned by the lighting of the LED 312 and display on the LCD 10 when the starting magnification exceeds the magnification range obtainable by the optical finder 31, the photographer is alerted to the mismatch of the photographic range and the field of view of the optical finder 31.

Modifications

Although the digital camera and recording medium of the embodiments have been described by way of examples, the present invention is not limited to these examples.

Figure 15:
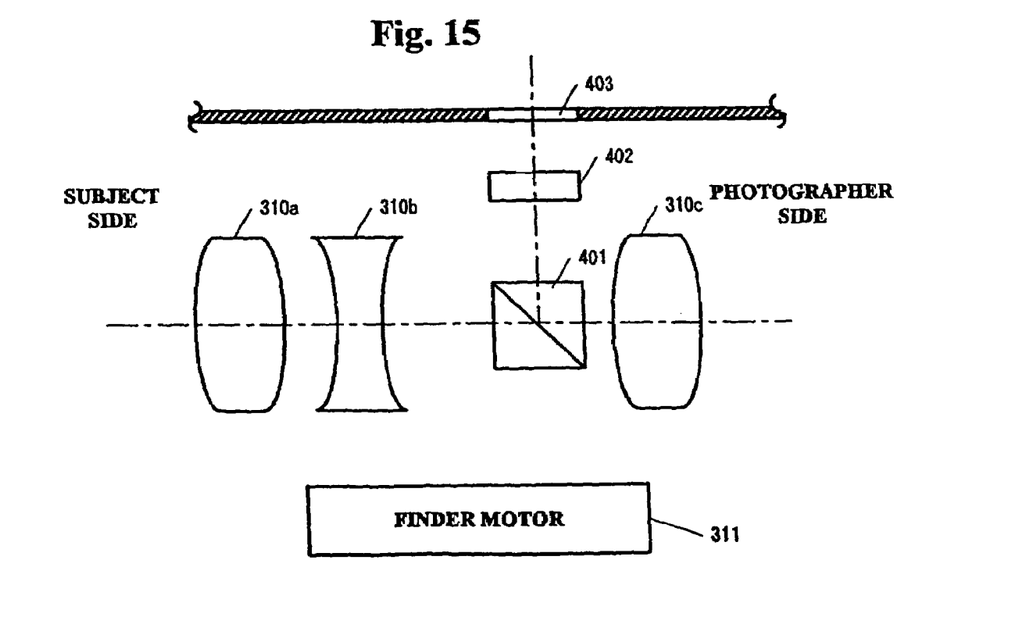
FIG. 15 shows a modification of the warning means.

For example, although the warning LED 312 is lighted and displayed in the warning LED control process, the warning means may be suitably modified. For example, a speaker may be provided to issue an audible warning or warning sound. FIG. 15 shows a modification of the warning means. This warning means is provided with a Porro prism 401 within the optical system of the optical finder, a transmission type LCD 402 disposed above the Porro prism 401, and a transparent window 403 provided on the top surface of the image sensing unit 3 is disposed above the LCD 402. External light entering the window 403 is transmitted through the transmission type LCD 402, and arrives at the photographer side via the Porro prism 401. Then, when the electronic zoom is used, a warning text is displayed on the transmission type LCD 402 and alerts the photographer. In this way the photographer can confirm the warning text overlaid on the photographic object via the optical finder, thereby easily being made aware of the use of the electronic finder.

The position at which the warning means is provided is also optional. Specifically, the warning means may be disposed on the surface of the camera body 2 insofar as it is observable while looking in the optical finder.

In the above described embodiments, the electronic finder is turned ON when transitioning from a state of using the optical zoom alone to the state of using the optical zoom and electronic zoom in combination. However, the present invention is not limited to this arrangement, and the range of the art of the present invention further includes which zoom only using an electronic zoom wherein the electronic zoom is turned ON when transition from a state of no zoom to a state of using the electronic zoom.

In the above embodiments, when the set magnification (effective magnification) exceeds the upper limit magnification (3.0×) of the optical finder, the warning LED 312 is lighted, and the LCD 10 forcibly displays in warning. However, the present invention is not limited to this arrangement, inasmuch as the warning LED 312 may be lighted and LCD 10 forced to display in warning when a specific lower limit different from 1.0× of the optical finder is set.

Although the upper limit magnification (zoom ratio) of the zoom lens 301 used as an optical zoom and the upper limit magnification (zoom ratio) of the optical finder 31 are both 3.0× in the above embodiments, these upper limits need not necessarily be identical. In this case, when, for example, the optical zoom magnification exceeds the zoom ratio of the optical finder, the warning LED 312 may be lighted and the display of the LCD 10 may be forced as an electronic finder.

Although the optical zoom is used in electronic zooming in the above embodiments, a mode may be provided for using electronic zoom alone. In this case, when the electronic zoom magnification exceeds the zoom ratio of the optical finder, the LCD 10 display may be forced as an electronic finder. Furthermore, while the above embodiments have been described as performing a pixel thinness process or pixel interpolation process after trimming the center area when using the electronic zoom, trimming may be performed alone.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A digital camera comprising:
   an optical finder for optically viewing a photographic object;
   an electronic finder for electronically displaying a photographic object;
   an operation member for performing an electronic zoom;
   a switching member for switching between an activated state and a deactivated state of the electronic finder;
   a zooming lens for image sensing; and
   a controller for setting the electronic finder to the activated state forcedly when an effective magnification of one or both an optical zoom of said zoom lens or said electronic zoom is less than a minimum or more than a maximum possible magnification of said optical finder.

2. A digital camera as claimed in claim 1, wherein the controller sets the electronic finder to the activated state forcedly, even if the electronic view finder had been manually turned off.

3. A digital camera as claimed in claim 2, further comprising an indicator for indicating a warning when electronic zoom is performed.

4. A digital camera as claimed in claim 3, wherein said indicator is provided at a position that is viewable when the photographer is looking in said optical finder.

5. A digital camera as claimed in claim 3, further comprising a zooming lens for image sensing, and said indicator indicates the warning when an effective magnification of one or both an optical zoom of said zoom lens or said electronic zoom exceeds a magnification range of said optical finder.

6. A digital camera as claimed in claim 1, wherein said controller maintains the state of said electronic finder even when said effective magnification is changed to more than a minimum and less than a maximum possible the magnification of the optical finder.

7. A digital camera comprising:
   an optical finder for optically viewing a photographic object;
   an electronic finder for electronically displaying a photographic object;
   an operation member for performing an electronic zoom;
   a switching member for switching between an activated state and a deactivated state of the electronic finder;
   a setter for setting a magnification for image sensing when the digital camera is activated; and
   a controller for setting said electronic finder to the activated state when said magnification is determined to be outside a magnification range of the optical finder, wherein said magnification range extends from a minimum to a maximum magnification of said optical finder.

8. A digital camera as claimed in claim 7, further comprising a memory for storing a magnification for image sensing when the digital camera power source is turned OFF, and said setter is set to the magnification stored in the memory.

9. A digital camera comprising:
   an optical finder for optically viewing a photographic object;
   an electronic finder for electronically displaying a photographic object;
   an operation member for performing an electronic zoom;
   a setter for setting a magnification for image sensing when the digital camera is activated; and
   an indicator for indicating a warning when said magnification is outside a magnification range of the optical finder, wherein said magnification range extends from a minimum to a maximum possible magnification of said optical finder.

10. A digital camera as claimed in claim 9, further comprising a memory for storing a magnification for image sensing when the digital camera power source is turned OFF, and said setter is set to the magnification stored in the memory.

11. A recording medium contains a program to be executed by a digital camera having an optical finder for optically viewing a photographic object, an electronic finder for electronically displaying a photographic object, an operation member for performing an electronic zoom, and a switching member for switching the electronic finder between an activated state and a deactivated state, said program implementing:
   performing the electronic zoom by said operation member; and
   setting said electronic finder to the activated state forcedly when an effective magnification of one or both an optical zoom and an electronic zoom is less than a minimum or more than a maximum possible magnification of said optical finder, even if the electronic view finder had been manually turned off.

* * * * *